Figure 1:
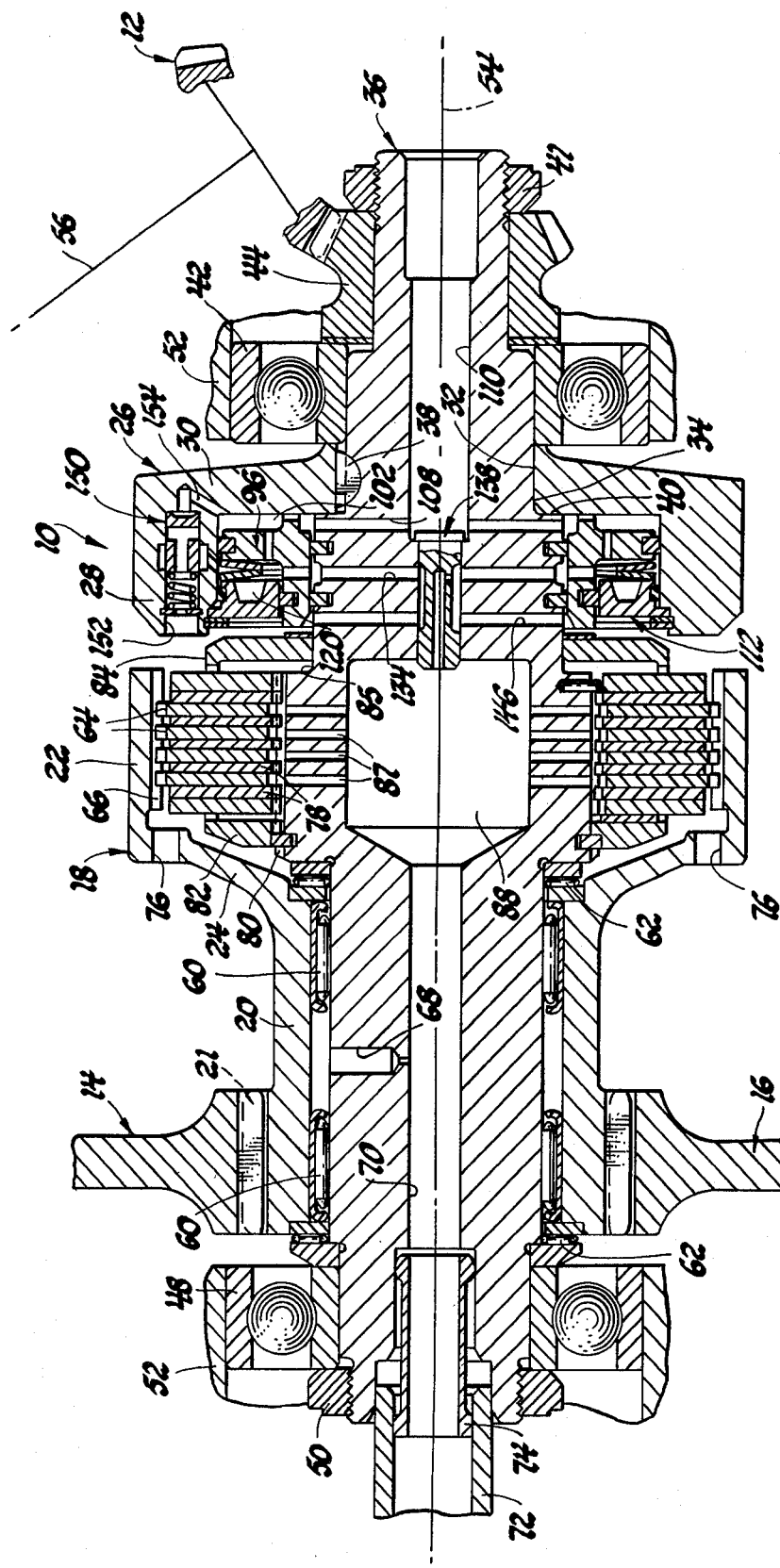

United States Patent [19]

Hawkins

[11] Patent Number: 4,458,797
[45] Date of Patent: Jul. 10, 1984

[54] CONTROL FOR ROTATING CLUTCH

[75] Inventor: Cyril M. Hawkins, Indianapolis, Ind.

[73] Assignee: General Motors Corporation, Detroit, Mich.

[21] Appl. No.: 380,512

[22] Filed: May 21, 1982

[51] Int. Cl.³ .................... F16D 25/063; F16D 43/28
[52] U.S. Cl. .................................. 192/52; 192/103 F; 192/85 AA
[58] Field of Search .................... 192/52, 70.12, 85 A, 192/85 AA, 85 F, 103 F, 103 FA, 105 F, 106 F, 109 F; 91/420, 416

[56] References Cited

U.S. PATENT DOCUMENTS

| | | | |
|---|---|---|---|
| 2,583,919 | 1/1952 | Wilson | 192/85 |
| 2,876,743 | 3/1959 | Maki | 192/85 AA |
| 3,151,719 | 10/1964 | Weidig | 192/85 A |
| 3,162,097 | 12/1964 | Allen et al. | 91/416 |
| 3,176,813 | 4/1965 | Lee et al. | 192/85 AA |
| 3,295,646 | 1/1967 | Peterson | 192/85 F |
| 3,750,789 | 8/1973 | Buchelt | 192/105 A |
| 3,819,020 | 6/1974 | Smith | 192/103 FA |

FOREIGN PATENT DOCUMENTS 2097874  11/1982  United Kingdom ............ 192/85 A

*Primary Examiner*—Rodney H. Bonck
*Assistant Examiner*—James J. Merek
*Attorney, Agent, or Firm*—Saul Schwartz

[57] ABSTRACT

A clutch having a rotating input member, a rotating output member, an annular cylinder on the input member, an annular piston in the cylinder defining therewith an apply pressure chamber on one side of the piston, a balance chamber on the opposite side of the piston filled with fluid when the apply pressure chamber is filled with fluid so that centrifugal force components of the fluids in the two chambers are balanced on the piston, and a valve on the input member biased by a spring to a closed position closing an exhaust passage from the balance chamber and exposed to pressure in the apply pressure chamber, the spring being calibrated to maintain the valve in its closed position against apply pressure until apply pressure achieves a magnitude corresponding to full clutch application whereupon the valve shifts to an open position allowing the balance chamber to exhaust so that the centrifugal pressure component of fluid in the apply pressure chamber is unbalanced to increase the torque capacity of the clutch.

3 Claims, 2 Drawing Figures

CONTROL FOR ROTATING CLUTCH

BACKGROUND OF THE INVENTION

1. Field of the Invention

This invention relates generally to power transmissions having fluid actuated ratio establishing devices and, more particularly, to a control arrangement for improving the performance of a fluid actuated rotating clutch.

2. Description of the Prior Art

Power transmissions of the planetary gear type typically include a plurality of planetary gear sets and fluid pressure actuated clutches for selectively interconnecting elements of one gear set with elements of another. Some of these clutches rotate during and after application so that fluid introduced into the rotating clutch at an apply pressure precisely regulated to control shift quality develops an additional centrifugal component varying with speed of clutch rotation. The centrifugal pressure component acts in addition to or with the apply pressure and, due to its variable nature, renders control of shift quality more difficult. To overcome this difficulty, rotating clutches have been proposed wherein a secondary or balance chamber is formed on the side of the clutch piston opposite the primary or apply pressure chamber so that when both chambers are filled with fluid and the clutch is rotating, substantially equal and oppositely directed centrifugal pressure components are developed which balance each other and render clutch application dependent solely on the fluid apply pressure as precisely regulated by the transmission control. In such designs, however, the centrifugal pressure components are always balanced so that increasing the ultimate torque capacity of the clutch requires an increase in ultimate or maximum apply pressure. In a rotating clutch having a control according to this invention centrifugal pressure components are balanced during clutch application for optimum shift quality control and unbalanced at full clutch application to improve the torque capacity of the clutch without resort to higher ultimate clutch apply pressure.

SUMMARY OF THE INVENTION

Accordingly, the primary feature of this invention is that it provides a new and improved control for a fluid pressure actuated rotating clutch in a power transmission. Another feature of this invention is that it provides a new and improved rotating clutch control wherein the centrifugal pressure component developed in the clutch apply pressure chamber is balanced during clutch application to facilitate control of shift quality and wherein the centrifugal pressure component developed in the clutch apply pressure chamber is unbalanced once the clutch is fully applied so that the ultimate torque carrying capacity of the clutch is improved. Still another feature of this invention resides in the provision in the new and improved rotating clutch control of a balance chamber on the side of the piston opposite the apply pressure chamber which balance chamber is filled with fluid at low pressure during clutch application so that centrifugal pressure components developed in the balance chamber and the apply pressure chamber are balanced and in the provision of a valve operative to automatically exhaust the balance chamber once the clutch is fully applied so that the unbalanced centrifugal pressure component in the apply pressure chamber increases the torque capacity of the clutch. Yet another feature of this invention resides in the provision in the new and improved rotating clutch control of a valve disposed on the rotating clutch and spring biased to a position closing an exhaust passage from the balance chamber, the valve being exposed to clutch apply pressure in the apply pressure chamber which pressure, upon achievement of a magnitude corresponding to full application of the clutch, shifts the valve against the spring to a position opening the exhaust passage from the balance chamber so that the centrifugal pressure component developed in the apply pressure chamber is unbalanced and increases the torque capacity of the clutch.

Figure 2:
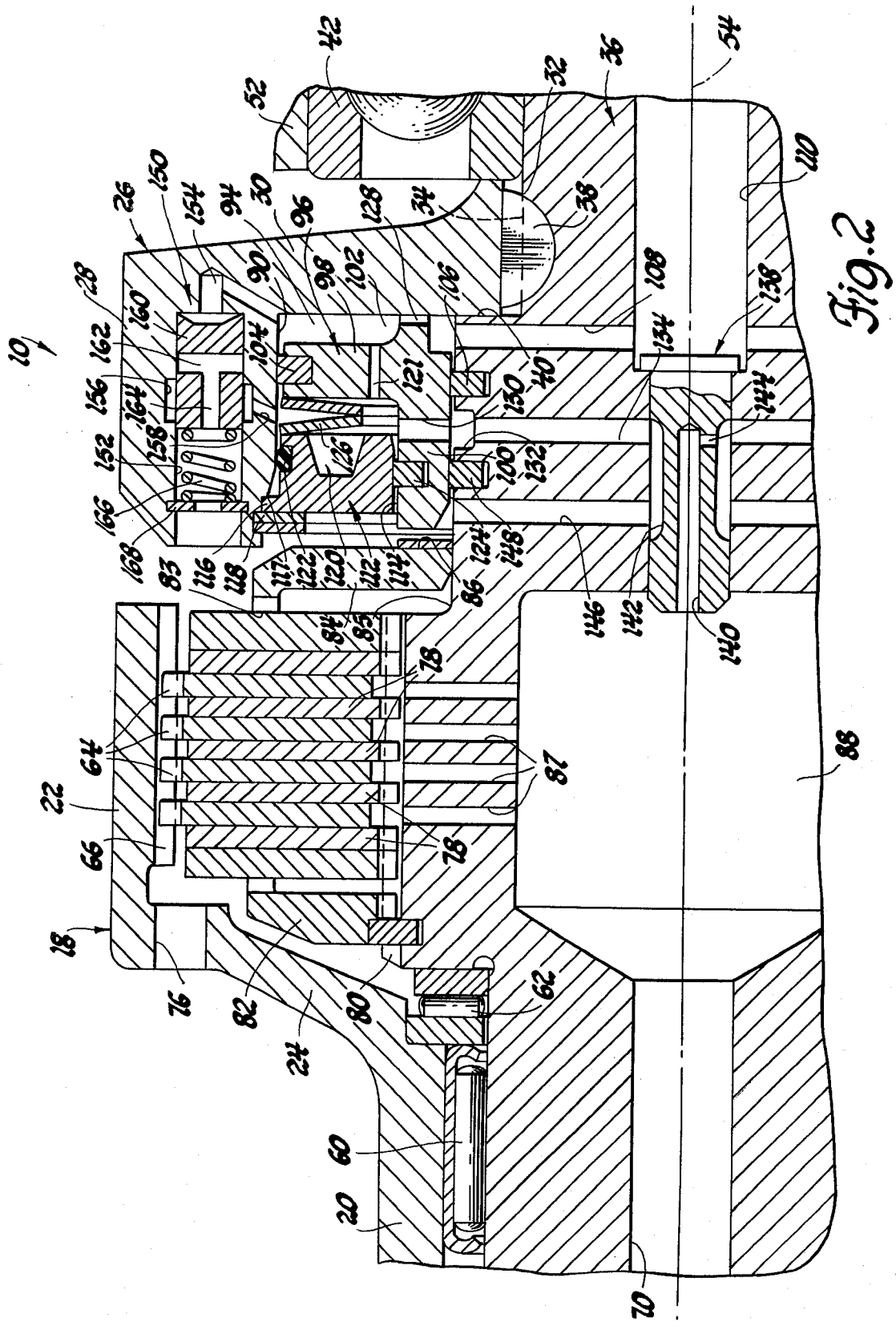

These and other features of this invention will be readily apparent from the following specification and from the drawings wherein:

FIG. 1 is a sectional view of a rotating clutch having a control according to this invention; and FIG. 2 is an enlarged view of a portion of FIG. 1 showing the rotating clutch control according to this invention.

Referring now to FIG. 1 of the drawings, a rotating clutch designated generally 10 provides selective connection between a schematically illustrated input gear 12 and a pair of output gears 14 and 16. The rotating clutch 10 includes an output member 18 having a cylindrical sleeve portion 20 with an array of external gear teeth 21 formed thereon and a larger cylindrical drum portion 22 connected to the sleeve portion by a web 24. The rotating clutch 10 further includes an input member 26 in the form of a drum having a relatively thick annular flange 28 and an integral radial web 30. The web 30 has a center bore 32 closely received on a cylindrical portion 34 of a shaft 36. The input member 26 is attached to the shaft 36 for rotation as a unit therewith by a key 38 between the shaft and the web 30. The web 30 butts against a radial shoulder 40 of the shaft 36 and is retained against the shoulder by a retainer 41 threaded on the end of shaft 36 and acting through the inner race of a roller bearing 42 and through a bevel gear 44. The roller bearing 42 cooperates with a similar roller bearing 48, mounted on the opposite end of shaft 36 and retained thereon by a retainer 50 in supporting the shaft 36 on a fixed structural member illustrated schematically at 52 for relatively high speed rotation about an axis 54. Input gear 12 is driven by conventional means, not shown, for rotation about an axis 56 and meshes with the teeth of bevel gear 44 thereby rotating the shaft 36. Similarly, teeth on output gear 14 and on output gear 16 mesh with gear teeth 21 on the sleeve portion 20 of output member 18 so that whenever the sleeve portion rotates the gears 14 and 16 likewise rotate.

Referring now to both FIGS. 1 and 2, the output member 18 of the rotating clutch 10 is rotatably supported on the shaft 36 by a pair of needle bearings 60 and by a pair of thrust bearings 62. A plurality of friction discs 64 are slidably supported within the drum portion 22 on a plurality of internal splines 66 so that the discs 64 rotate as a unit with the output member. An orificed radial bore 68 in the shaft 36 extends from the outside diameter of the shaft between the bearings 60 to a low pressure fluid passage 70 extending along the axis 54. A schematically illustrated tube 72 directs lubricating and cooling fluid into the low pressure passage 70 through a connector 74 and through the bore 68 to the bearings 60 and 62. The lubricating and cooling fluid escapes around the bearings 60 and 62 and drains between sleeve portion 20 and bearing 48 and through a plurality of apertures 76 through the web 24.

With continued reference to FIGS. 1 and 2, a plurality of friction discs 78 arranged between the friction discs 64 are slidably supported on a plurality of splines 80 on the shaft 36 for rotation as a unit with the shaft and the full stack of discs 64 and 78 is disposed between an annular backing plate 82 rigidly attached to the shaft 36 and an outer circular edge 83 of an intermediate disc 84 slidably disposed on a cylindrical portion 85 of shaft 36. As more fully described hereinafter, the circular edge 83 of the intermediate disc 84 operates to compress the friction discs 64 and 78 against the backing plate 82 when force is applied to an inner circular edge 86 of the intermediate disc. A plurality of radial bores 87 extend between the splines 80 and an enlarged cavity 88 within the shaft 36 in communication with low pressure passage 70. Lubricating and cooling fluid fills the cavity 88 and is directed radially outward between and around the friction discs 78 and 64 to lubricate and cool the latter before escaping through apertures 76 or through the open end of drum portion 22.

As seen best in FIG. 2, an inside cylindrical surface 90 of the flange 28 of the input member is radially spaced from the cylindrical portion 85 on the shaft 36 and cooperates therewith in defining an annular cylinder 94 opening toward intermediate disc 84 and closed by web 30 of the output member. An annular piston 96 is slidably disposed in the cylinder 94 and includes a radially extending partition portion 98 and an axially extending cylindrical portion 100. The partition portion 98 cooperates with the web 30 in defining a primary or apply pressure chamber 102 behind the piston fluid sealed by a seal ring 104 carried by the piston and a similar seal ring 106 carried by the shaft 36. A plurality of radial bores 108 in the shaft 36 extend between the apply pressure chamber 102 and a high pressure passage 110 extending longitudinally of the shaft and connecting with cavity 88. As described more fully hereinafter, fluid at high pressure enters apply pressure chamber 102 from passage 110 through bores 108 and moves piston 96 to the left to engage cylindrical portion 100 of the piston against inner circular edge 86 of intermediate disc 84 for the purpose of compressing the stack of friction discs 64 and 78 against the backing plate 82.

Referring again to FIG. 2, a closure ring 112 is disposed between an outer surface 114 of the piston cylindrical portion 100 and the inside cylindrical surface 90 of the flange 28. An annular flange 116 on the closure ring is captured between a shoulder 117 on the flange 28 and a retaining ring 118 seated in an appropriate groove in the flange 28, the closure ring thereby being rigidly mounted on and rotatable with the input member 26. The closure ring 112 cooperates with the piston 96 in defining an annular balance or secondary chamber 120 communicating with apply pressure chamber 102 through an orifice 121 and sealed against leakage by a seal ring 122 on the closure ring 112 and a similar seal ring 124 on the piston cylindrical portion 100. A Belleville type spring 126 is disposed in the balance chamber 120 between the closure ring 112 and the piston partition portion 98 and urges the piston to a retracted position, FIG. 2, wherein a grooved stop 128 on the piston engages the web 30. A plurality of radial bores 130 in the piston cylindrical portion 100 provide communication between the balance chamber 120 and an annular groove 132 in the cylindrical portion 85 of the shaft 36. A plurality of radial bores 134 in the shaft extend between the groove 132 and the high pressure passage 110.

A stopper 138 is disposed in the high pressure passage 110 and prevents communication between the high pressure passage and the cavity 88. The stopper includes an axial bore 140 opening into the cavity 88 and an outer annular groove 142. The annular groove 142 is connected to the axial bore 140 by an orifice 144 and spans the radial bores 134 and a plurality of similar radial bores 146 extending between the high pressure passage 110 and cylindrical portion 85 to the left of piston 96. A seal ring 148 between the piston cylindrical portion 100 and the shaft 36 cooperates with seal ring 106 in preventing fluid leakage into or out of groove 132.

The rotating clutch 10 functions to selectively connect the input gear 12 with the output gears 14 and 16. More particularly, fluid supplied by a pump, not shown, is selectively directed to the high pressure passage 110 by a valve assembly, not shown, which also precisely regulates both the magnitude of the fluid pressure in the passage and the rate at which that pressure increases from zero to a maximum value. When rotating clutch 10 is in a non-applied condition, high pressure passage 110 is exhausted and spring 126 maintains piston 96 in its retracted position. Balance chamber 120 may contain residual fluid which, if present, develops a centrifugal pressure component due to rotation of shaft 36 and input member 26 urging piston 96 rightwardly, FIG. 2, toward its retracted position.

When the clutch 10 is to be applied, the transmission control valve assembly, not shown, directs fluid under pressure to the high pressure passage 110 which fluid quickly fills the passage, the radial bores 108 and the apply pressure chamber 102. Substantially simultaneously, the piston 96 moves leftward to take up any clearance between itself and the inner circular edge 86 of intermediate disc 84 and between the latter and the stack of friction discs 64 and 78 whereupon apply pressure increases on a schedule determined by the transmission control valve assembly from minimum to a maximum magnitude corresponding to full clutch application. Since torque is transferrable between the input member 26 and the output member 18 in proportion to the force applied by intermediate disc 84, and hence to apply pressure, progressively more torque is transferred until apply pressure achieves its maximum magnitude and all slip between friction discs 64 and 78 ceases. In this full applied condition the torque capacity of the clutch is proportional to maximum apply pressure so that one way to improve the ultimate capacity of the clutch is to increase the maximum apply pressure in apply pressure chamber 102.

During the interval of apply pressure increase, balance chamber 120 is filled with fluid through orifice 121 in the piston partition portion 98. Accordingly, fluid in each of the chambers 102 and 120 develop a centrifugal pressure component since the input member 26 and shaft 36 are rotating at substantial speed. With the chambers 102 and 120 being substantially equal in volume and substantially equally radially spaced from the axis 54, the forces resulting from the centrifugal pressure components act in opposite directions on the piston and are generally equal in magnitude so that the centrifugal pressure components are balanced. The result is that the rate of increase and the magnitude of clutch apply pressure depends only on the transmission control valve assembly which is programmed to provide smooth clutch application. Balance chamber 120 is vented through bores 130, groove 132, radial bores 134, groove 142, and radial bores 146 so that apply pressure chamber 102 is allowed to expand during clutch application while the balance chamber 120 shrinks and so that non-centrifugally induced pressure in balance chamber 120 is limited to a nominal magnitude.

Referring again to both FIGS. 1 and 2, to improve the ultimate torque capacity of the rotating clutch 10, a rotating clutch control according to this invention and designated generally 150 is provided and includes a cylindrical bore 152 in the flange 28 opening toward intermediate disc 84. The closed end or base of the bore 152 is connected to the apply pressure chamber 102 by drilled passages forming a conduit 154. The balance chamber 120 is connected to an annular groove 156 around the bore 152 by a passage 158. A cylindrical valve element 160 is slidably disposed in the bore 152 and includes a cross passage 162 and an axial passage 164 communicating with the cross passage and the left end of the valve element, FIG. 2. A spring 166 seats at one end against the valve element 160 and at the other end against a retaining ring 168 rigidly supported on the flange 28 of the input member 26. The spring biases the valve element 160 to a closed position, FIG. 2, wherein the valve element abuts the closed end of bore 152 with a solid cylindrical portion of the valve element overlying the annular groove 156 to prevent communication between the balance chamber 120 and the fluid drainage area to the left of the valve element in the bore 152.

Describing now the operation of rotating clutch control 150, during the interval of increasing clutch apply pressure in apply pressure chamber 102, the instantaneous pressure in that chamber is directed through conduit 154 against valve element 160 urging the latter leftward against spring 166. Spring 166 is calibrated to resist movement of the valve element until the instantaneous pressure in apply pressure chamber 102 achieves a magnitude corresponding to complete application of the clutch without any slip between the friction discs 64 and 78, this magnitude generally being equal to maximum pump or line pressure. Accordingly, during this phase of clutch operation, balance chamber 120 remains filled with fluid and centrifugal pressure components on piston 96 are balanced for smooth clutch application.

When the pressure in apply pressure chamber 102 achieves maximum magnitude corresponding to complete clutch application, the corresponding force developed on the valve element 160 is sufficient to overcome the opposing force of spring 166. The valve element 160 is then shifted to the left, FIG. 2, from the closed position to an open position, not shown, wherein the cross bore 162 at least partially registers with the groove 156 around the bore 152. In the open position of the valve element 160 balance chamber 120 exhausts through the passage 158, the annular groove 156, the cross bore 162, and the axial passage 164 in the valve element. When the balance chamber is thus exhausted, the centrifugal pressure component developed therein acting on the side of the piston 96 opposite apply pressure chamber 102 substantially disappears. The centrifugal pressure component developed in apply pressure chamber 102 is thus unbalanced and functions to increase the force with which the piston 96 compresses the stack of friction discs 64 and 78 through the intermediate disc 84. With the force on the stack of friction discs thus increased, the clutch has an improved, higher torque capacity even though the maximum pump pressure or line pressure has not increased.

As long as the valve element 160 remains in the open position, balance chamber 120 is exhausted as described. But even when so exhausted, fluid continues to flow from the apply pressure chamber 102 through orifice 121 to provide cooling and lubrication. To return rotating clutch 10 to the non-applied condition, high pressure passage 110 is exhausted and spring 126 urges the piston 96 to its retracted position. Simultaneously, the spring 166 shifts the valve element 160 from the open position back to the closed position, FIG. 2, wherein it severs the connection between balance chamber 120 and bore 152. The balance chamber 120 quickly fills with low pressure fluid which develops a centrifugal pressure component balancing the centrifugal pressure component of residual fluid in apply pressure chamber 102 so that the action of Belleville spring 126 in shifting the piston 96 to its retracted position is not impeded. The rotating clutch control 150 is then conditioned for a subsequent, identical operational cycle.

The embodiments of the invention in which an exclusive property or privilege is claimed are defined as follows:

1. In a clutch having a first rotating member, a second rotating member, means defining a cylinder on one of said first and said second rotating members, a piston slidably disposed in said cylinder and cooperating therewith in defining an apply pressure chamber, and means operative to supply fluid to said apply pressure chamber at an apply pressure for urging said piston into engagement on a plurality of relatively rotatable friction members connected to respective ones of said first and said second members whereby torque is transferable between said first and said second rotating members in proportion to the magnitude of said apply pressure, the combination comprising, means on said one rotating member and on said piston defining a balance chamber on the side of said piston opposite said apply pressure chamber, means for maintaining fluid in said balance chamber so that centrifugally induced pressure components therein oppose and balance corresponding centrifugally induced pressure components in said apply pressure chamber, and valve means on said one rotating member connected to said balance chamber and responsive to the magnitude of pressure in said apply pressure chamber to exhaust said balance chamber when said magnitude exceeds a predetermined magnitude corresponding to complete clutch application so that thereafter centrifugally induced pressure components in said apply pressure chamber are unbalanced and increase the torque transfer capacity of said clutch.

2. In a clutch having a first rotating member, a second rotating member, means defining an annular cylinder on one of said first and said second rotating members, an annular piston slidably disposed in said annular cylinder and cooperating therewith in defining an annular apply pressure chamber, and means operative to supply fluid to said apply pressure chamber at an apply pressure for urging said piston into engagement on a stack of relatively rotatable friction discs connected to respective ones of said first and said second rotating members whereby torque is transferable between said first and said second rotating members in proportion to the magnitude of said apply pressure, the combination comprising, means on said one rotating member and on said piston defining an annular balance chamber on the side of said piston opposite said apply pressure chamber, an orifice in said piston between said apply pressure chamber and said balance chamber operative to fill said balance chamber with fluid when said apply pressure chamber is filled with fluid, vent means on said one rotating member radially inboard of said balance chamber for limiting non-centrifugally induced pressure in said balance chamber to a nominal magnitude while permitting development of centrifugally induced pressure components in said balance chamber in opposition to and balancing centrifugally induced pressure components in said apply pressure chamber, an exhaust port on said one rotating member disposed radially outboard of said balance chamber and connected thereto, and valve means on said one rotating member normally closing said exhaust port and responsive to the magnitude of pressure in said apply pressure chamber to open said exhaust port and exhaust said balance chamber when said pressure in said apply pressure chamber exceeds a predetermined magnitude corresponding to a complete clutch application so that thereafter centrifugally induced pressure components in said apply pressure chamber are unbalanced and increase the torque transfer capacity of said clutch.

3. In a clutch having a first member rotatable on an axis, a second shaft rotatable on said axis, means defining an annular cylinder on one of said first and said second rotatable members, an annular piston slidably disposed in said annular cylinder and cooperating therewith in defining an annular apply pressure chamber, and means operative to supply fluid to said apply pressure chamber at an apply pressure for urging said piston into engagement on a stack of relatively rotatable friction discs connected to respective ones of said first and said second rotatable members whereby torque is transferable between said first and said second rotatable members in proportion to the magnitude of said apply pressure, the combination comprising, means on said one rotatable member and on said piston defining an annular balance chamber on the side of said piston opposite said apply pressure chamber, an orifice in said piston between said apply pressure chamber and said balance chamber operative to fill said balance chamber with fluid when said apply pressure chamber is filled with fluid, vent means on said one rotatable member radially inboard of said balance chamber for limiting non-centrifugally induced pressure in said balance chamber to a nominal magnitude while permitting development of centrifugally induced pressure components in said balance chamber in opposition to and balancing centrifugally induced pressure components in said apply pressure chamber, an exhaust port on said one rotatable member disposed radially outboard of said balance chamber and connected thereto, a cylindrical valve bore in said housing parallel to said axis and intersecting said exhaust port, passage means connecting said apply pressure chamber to said valve bore, a valve element disposed in said valve bore and shiftable between a closed position closing said exhaust port and an open position opening said exhaust port and exhausting said balance chamber, said valve element being exposed through said passage means to the pressure in said apply pressure chamber and urged thereby toward said open position, and spring means biasing said valve element toward said closed position, said spring means exerting a force operative to maintain said valve element in said closed position until said apply pressure chamber pressure exceeds a predetermined magnitude corresponding to complete clutch application whereupon said valve element is shifted to said open position so that said balance chamber is exhausted and centrifugally induced pressure components in said apply pressure chamber are unbalanced and increase the torque transfer capacity of said clutch.

* * * * *